(12) United States Patent
Godbehere et al.

(10) Patent No.: US 6,582,792 B1
(45) Date of Patent: *Jun. 24, 2003

(54) COMPOSITE MATERIAL CONSTRUCTION

(75) Inventors: Andrew P Godbehere, Winscombe (GB); Stephen Williams, Ebbw Vale (GB); Robert D Spear, Bristol (GB)

(73) Assignee: BAE Systems PLC (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/490,955

(22) Filed: Jan. 24, 2000

Related U.S. Application Data

(63) Continuation of application No. PCT/GB99/02670, filed on Dec. 8, 1999.

(51) Int. Cl.⁷ .................................. B32B 3/00
(52) U.S. Cl. .......................................... 428/57; 428/60
(58) Field of Search ........................ 428/113, 60, 57; 74/231; 138/78; 244/123

(56) References Cited

U.S. PATENT DOCUMENTS

| | | | |
|---|---|---|---|
| 4,034,617 A | * | 7/1977 | Guyer .......................... 74/231 |
| 4,741,943 A | | 5/1988 | Hunt |

FOREIGN PATENT DOCUMENTS

| | | |
|---|---|---|
| EP | 0 293 320 | 11/1988 |
| EP | 0 826 488 | 3/1998 |
| GB | 2 072 579 | 10/1981 |
| GB | 2 249 050 | 4/1992 |

* cited by examiner

*Primary Examiner*—Harold Pyon
*Assistant Examiner*—Jane Rhee
(74) *Attorney, Agent, or Firm*—Barnes & Thornburg

(57) ABSTRACT

A method of constructing a composite material which comprises a laminate of plies comprising a warp dominated ply and a weft dominated ply, includes arranging first and second pieces 10,12 of material alongside each other with a recess 20 being defined at least partly by a warp dominated ply 14 so that parts 16,18 thereof form a lap joint 21 which is received at least partly in a recess 20 formed in or by a warp dominated or other ply, and arranging at least part 12*a* of one of said first and second pieces of material 10,12 in said recess 20 so as to form lap joint 21 with part 10*a* of the other of the first and second pieces of material 10,12. The parts 10*a*, 12*a* of said first and second pieces of material include weft dominated plies 16,18.

36 Claims, 3 Drawing Sheets

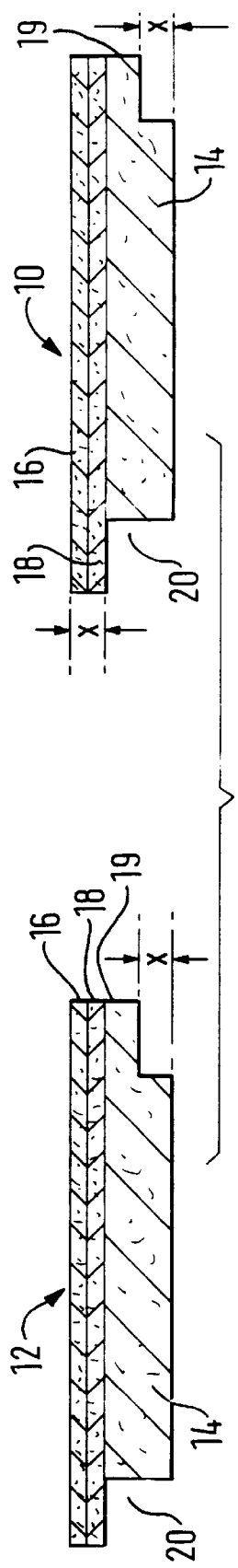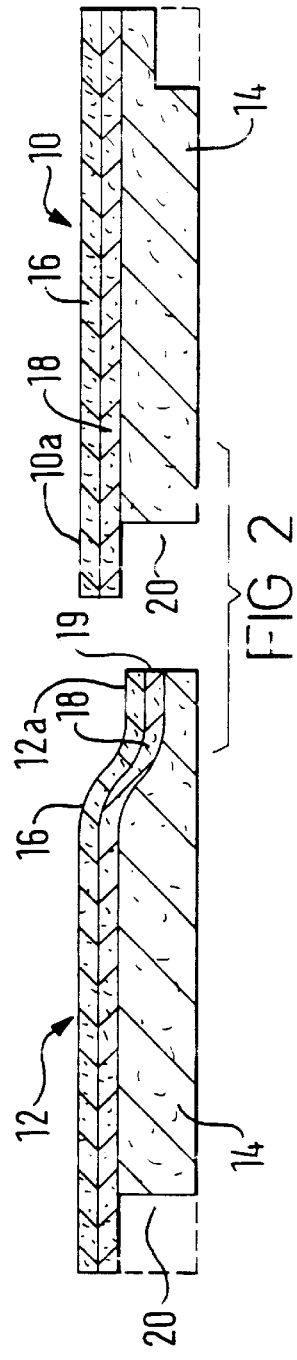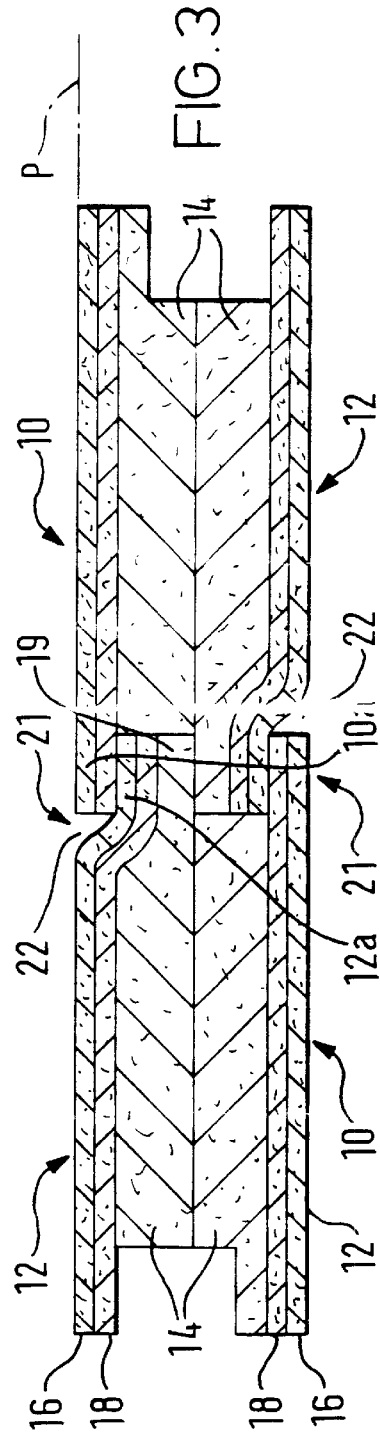

COMPOSITE MATERIAL CONSTRUCTION

This is a continuation of International Application No. PCT/GB/99/02670, filed Dec. 8, 1999.

The invention relates to a composite material construction. In particular, the invention relates to a method of joining pieces of material so as to form a composite material and to a composite material made by such a method primarily for use in aircraft construction.

It is known to produce wing skins from composite laminae formed from multi-axial fibres such as non-crimp or warp knitted fabric. Such skins are produced by laying several layers of fabric into a stack of required thickness. The term "Multi-axial" means that alternate layers of fibre will be constructed in several different directions to produce a fabric with optimum strength in required directions. Commonly used directions for wing skin manufacture are 0° (spanwise for the wing) +45°, −45° and 90° (substantially chordwise). An example of such a skin is described in out Patent Application EP-A-0 826 488 where the +45° and −45° plies form an overlap on the 90° plies. Normally the 0° plies are warp dominated and the remaining plies weft dominated. The term "Non-crimp" refers to fabrics where warp and weft dominated fibres are laid one upon the other in non-woven fashion up to a required thickness. The fiber layers are then interconnected by a warp knitting process.

Where a multi-axial composite material is to be produced, utilising non-crimp fabrics, current machines can construct fabrics containing multi-axial layers only up to a width of 1.72 m. Structures wider than 1.72 m require two or more pieces of such fabric to be joined together using a joint for the ±45° layers. An overlap joint fulfilling such a requirement is described in the above patent application.

The present application is concerned with a composite material construction involving the joining of material with alternative forms of joints in which the disruption to component thickness is minimised.

According to a first aspect of the invention there is provided a method of constructing a composite material which comprises a laminate of plies comprising warp dominated and weft dominated plies, the method being characterised by including arranging first and second pieces of material for use in the construction alongside each other with a recess being defined at least partly by a warp dominated or other ply, and arranging at least part of one of said first and second pieces of material in said recess so as to form lap joint with part of the other of the first and second pieces of material, the said parts of said first and second pieces of material including weft dominated plies.

By allowing part of one of the first and second pieces of material to be received in the recess, the disruption to component thickness resulting from the joint is minimised.

In one embodiment, each of the first and second pieces of material comprises a laminate of plies comprising a warp dominated ply and a weft dominated ply, the method including arranging the two pieces of material alongside each other with edges of the warp dominated ply of each piece extending in the same direction and with the weft dominated plies forming the lap joint. With such a method, the warp dominated ply forms part of the pieces of material to be joined together enabling a wide composite material to be built up from smaller sections of composite material.

With the arrangement disclosed in the immediate proceeding paragraph, the method may include forming the recess in an edge of the first said piece of composite material.

The corresponding edge of the second piece of composite material may be formed in the same way. The method may include forming the recess by setting one set edge of the warp dominated ply of the first piece back from an adjacent edge of the weft dominated ply forming part of the lap joint. Such an arrangement will provide a particularly simple way of defining the recess.

Where the recess is formed in an edge of the first piece of composite material, the method may include reducing the thickness of the warp dominated ply of the second piece of material adjacent its said edge to enable the weft dominated ply and a remainder part of the warp dominated ply to enter the recess when forming the lap joint. The method may include forming the corresponding edge of the first piece of the material in the same way.

The method may include bringing an edge of the remainder part of the warp dominated ply of the second piece into abutment with the edge of the warp dominated ply of the first piece when forming the lap joint.

In another embodiment, the method may include forming the recess by providing or forming between the edges of warp dominated plies or within a width of a warp dominated ply a length of thinner warp dominated material. In either case, the length of the thinner warp dominated material is preferably formed from higher filament count or higher modulus fibres compared to fibres used to construct the warp dominated plies. The lap joint may be formed so that part of the weft dominated ply of only one of the pieces lies in the recess with part of the other weft dominated ply of the other piece overlapping at least a portion of it.

The method may include placing a layer of warp dominated material on the outside of a lap joint. By doing that, it is possible to compensate for any reduction in strength which may arise due to the use of the thinner warp dominated material.

In a further embodiment, the method may include forming the recess as a groove in one surface of the warp dominated ply and providing a further weft dominated ply on the opposite surface of the warp dominated ply. The recess may be formed in, for example, a centre section of the warp dominated ply although it may be formed at other positions.

Conveniently, two pieces of material to be joined together may be fed to a machine so as to form the lap joint, the warp dominated ply and the further weft dominated ply as a single laying-up operation. As will be appreciated, such a method forms a convenient way of joining together the pieces of material by machine. Moreover, the method enables a machine previously used for bi-axial laying-up to be used to produce a multi-axial composite material much wider than would be possible on normal multi-axial laying-up machines.

With any of the foregoing embodiments in accordance with the invention, it is possible to form two layers of the jointed material with one layer inverted relative to the other with the weft dominated plies forming outer surfaces of the two layers.

Alternatively, the inversion can take place so that the warp dominated plies form the outer surfaces of the two layers.

According to a second aspect of the invention, there is provided an aerofoil having a skin formed from materials joined by the method according to the first aspect of the invention or any of the consistory clauses relating thereto.

According to a third aspect of the invention, there is provided an aircraft skin panel formed from material joined by the method according the first aspect of the invention or any of the consistory clauses relating thereto.

According to a fourth aspect of the invention there is provided a method of constructing a composite material which comprises a laminate of plies comprising a warp dominated ply and a weft dominated ply, the method including arranging first and second pieces of material for use in the construction alongside each other so that parts thereof form a lap joint which is received at least partly in a recess formed in or by a warp dominated or other ply, the said parts of said first and second pieces of material including weft dominated plies.

According to a fifth aspect of the invention there is provided a composite material construction which comprises a laminate of plies comprising warp dominated and weft dominated plies, characterised in that the construction comprises first and second pieces of material arranged alongside each other, a recess being defined at least partly by a warp dominated or other ply, part of one of said pieces of material being received in the recess and forming a lap joint with a part of the other piece of material, the said parts of the first and second pieces of material including weft dominated plies.

According to a sixth aspect of the invention there is provided a composite material construction which comprises a laminate of plies comprising a warp dominated ply and a weft dominated ply, a recess being defined at least partly by the warp dominated ply and parts of the weft dominated ply being arranged alongside each other so as to form a lap joint at least part of which is received in the recess.

The material used in the composite material construction may have the features of the material set out in the first aspect of the invention or any consistory clause relating thereto.

Composite material construction in accordance with the invention will now be described by way of example with reference to the accompanying drawings in which:

FIG. 1 is a diagrammatic cross-section through two pieces of composite material to be joined together by a method in accordance with the invention;

FIG. 2 shows diagrammatically the way in which an edge of the first piece of material is pressed down prior to mating with the other piece;

FIG. 3 shows the way in which the pieces of material join together.

Figure 4:
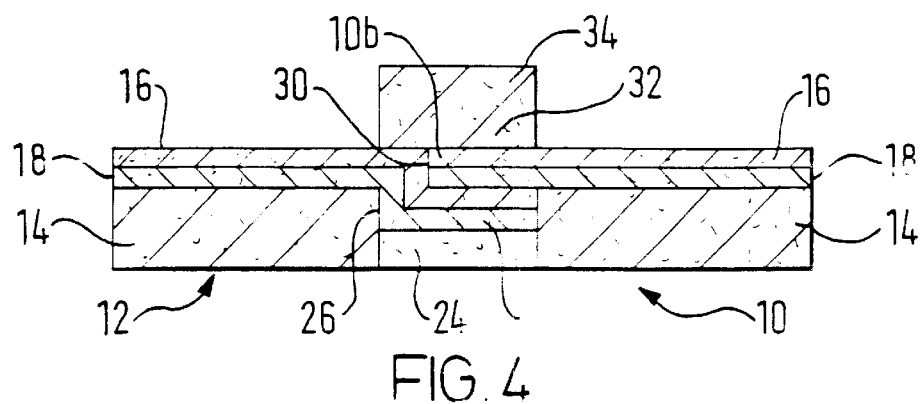
FIG. 4 shows diagrammatically different method of joining material together to form a composite material.

Referring to FIGS. 1 to 3, first and second pieces of material 10,12 are substantially identical in construction and each one comprises a warp dominated ply 14 (referred to herein as a 0° ply) and two weft dominated plies 16,18. The weft dominated plies 16,18 are arranged at +45° and −45° relative to the 0° ply 14.

It will be noted that the right hand edge of each 0° ply 14 as viewed in the drawings is reduced in thickness by a distance x which corresponds substantially to the thickness of the ±45° plies 16, 18 thereby forming a thinned area 19. The left-hand edge of each piece 10,12 is formed so that the 0° ply is set back from the left-hand edge of the ±45° plies. In that way, a recess 20 is formed at the left-hand edge of each piece 10,12 defined by the weft dominated ply 18 and the warp dominated ply 14.

As shown in FIG. 2, the right-hand edge of the second piece 12 is pressed down before the two pieces are brought together manually or by machine. The pressing down is facilitated by the thinning of the right-hand edge of the second piece 12. Finally, the two pieces 10, 12 are mated together as shown in FIG. 3 so that the right hand edge of the second piece 12 is received within the recess 20 of the first piece 10 with the 0° ply 14 of each piece 10,12 in edge to edge abutment and parts 10a, 12a of the two ±45° plies 16,18 of the pieces 10,12 to form a lap joint 21. Advantageously, the upper surfaces of the pieces 10, 12 formed by ±45° plies lie substantially in the same plane P with virtually no disruption to the component thickness.

Once the materials have been put together, a suitable bonding matrix is applied to impregnate the material so as to bind the plies together and to fill the joint 21 and the gap 22, shown in FIG. 3. The composite material is then placed in an autoclave where the matrix is cured under heat and pressure.

As shown in FIG. 3, further first and second pieces 10a,12a can be inverted and placed against the first and second pieces 10, 12, prior to curing in the autoclave, to double the thickness of the composite material, again without any significant disruption to the overall component thickness due to the lap joint 21. By arranging the pieces 10,12, 10a, 12a in the manner shown in FIG. 3, a balanced lay-up is achieved which is a desirably feature. In the case illustrated, looking from bottom to top in FIG. 3, the layers balance as follows:

+45°, −45°, 0°, 0°, −45°, +45°

Two or more balanced lay-ups, as shown in FIG. 3, can be placed one upon the other, if desired, to provide a composite to skin of increased thickness which is then cured under heat and pressure.

The production of the reduced thickness right-hand edge of piece 10, 12 and the production of the recess 20 is preferably carried out as part of the lay-up process for the pieces 10, 12. On existing multi-axial fabric making machines, the maximum width of each piece 10, 12, that can be made is 1.7 m. Aircraft surfaces such as wings can commonly require fabrics having a greater width than 1.7 m. The only way of achieving greater widths is, therefore, by joining two pieces together and the methods shown in FIGS. 1 to 3 provide a method resulting in minimal disruption to component thickness. If no more than two pieces 10,12 are joined together, the respective right and left-hand ends of those pieces need not be shaped as shown but could simply be left plain as shown in broken lines in FIG. 2.

Looking next at FIG. 4, the first and second pieces 10,12 are formed differently. Instead of forming a thinned area 19 at the edge of the second piece 12, both pieces 10,12 have their 0° plies 14 spaced apart by a section of thinner warp dominated material 24 (again preferably of 0°). The thinner section 24 is formed of higher filament count fibres or higher modulus fibres. In that way, although the section 24 is thinner than the 0° plies of the pieces 10, 12, the nature of the material 24 is such that it at least partially compensates for the absence of the thicker warp dominated material absent from that position. The use of the thinner section 24 effectively produces a recess 26 defined by the thinner section 24 and the 0° plies 14 of the pieces 10,12. if desired, the thinner 0° section of material 24 can be formed on the edge of one piece of material 10 and brought into abutment with the edge of the second piece of material 12 to form the recess 26.

As shown in FIG. 4, the ±45° plies 16, 18 of the second piece 12 include a portion 12b which substantially fills the recess 26 leaving a step 30. Part 10b of the ±45° plies 16, 18 of the first piece 10 occupies the step 30 and forms an overlap joint 32 with the portion 12b. In the event that the thinner 0° section 24 does not fully compensate for absence of the thicker 0° ply as described above, a 0° ply cap 34 can be placed on the top surfaces of the ±45° plies to provide full compensation as shown in FIG. 4. It should be stressed that FIG. 4 is a diagrammatic and the 0° ply cap 34 will normally have sloping sides 35 as shown diagrammatically in FIG. 6 typically arranged at a gradient of 1:20.

Figure 5:
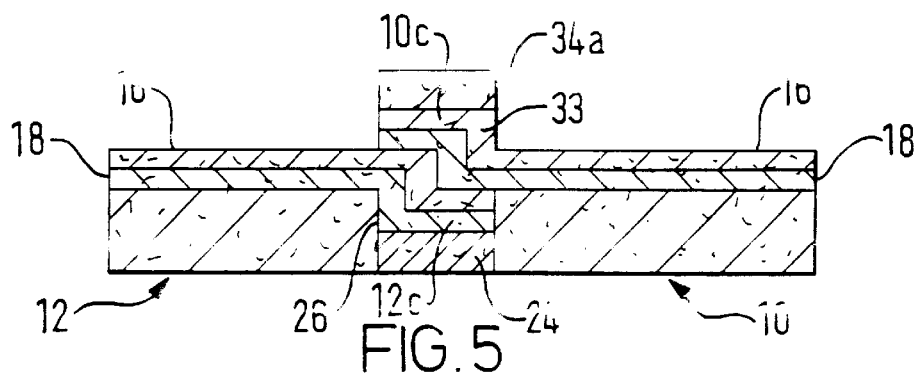
FIG. 5 shows a modification of the method shown in FIG. 4.
Figure 6:
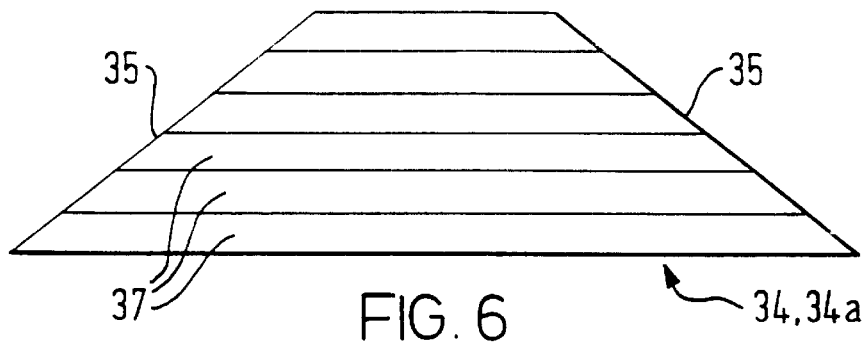
FIG. 6 shows diagrammatically a cap used in the method of FIGS. 4 and 5.

Looking at FIG. 5, it will be seen that the section 24 is not as wide as shown in FIG. 4 and part 10c of the ±45° plies 16, 18 of the first piece 10 steps on to the top of the ±45° layers 16, 18 of a part 12c of the second piece 12 to form a lap joint 33. The part 10c helps to compensate for any loss of strength due to the use of the thinner 0° section 24. If any further compensation is required a ply cap 34a, thinner than the cap 34 shown in FIG. 4 can be applied. It is envisaged that the cap 34a will taper downwardly somewhat as shown in FIG. 6. if desired, several layers of joined materials can be built up and then a single capping piece applied to a surface of the ±45° plies as desired. As shown in FIG. 6, the capping 34 may be brought up by several plies 37 of 0° material where the same number of plies of composite material have been built up to produce the full component thickness.

Where the joined composite material is to be used, say as a wing skin for an aircraft, it is important that there is minimum disruption at the outer surface of the skin.

Therefore, if possible, the component forming the wing skin should have the cap 34 or 34a directed towards the inside of the wing leaving the 0° plies to provide a substantially uninterrupted surface ply forming the outer surface of the wing skin.

In FIGS. 4 and 5, the 0° plies 14, 24 can be made in one piece by a single operation in a laying-up machine and two separate ±45° plies that are subsequently fed to the machine to form the lap joints 32, 33. In that way, two separate pieces of composite material 10, 12 are not required although two separate ±45° layers are provided and fed to the laying-up machine so as to produce the overlap joint 32.

Machines are known which will produce bi-directional laying-up of fibres, for example, 0° and 90°. Those machines will produce fabric in widths of up to 5 m. Therefore, by using a method as described in respect to FIGS. 4 and 5 where two ±45° plies are fed to such a machine, the machine can be used to produce multi-axial fabrics having a width substantially greater that 1.7 m.

Figure 7:
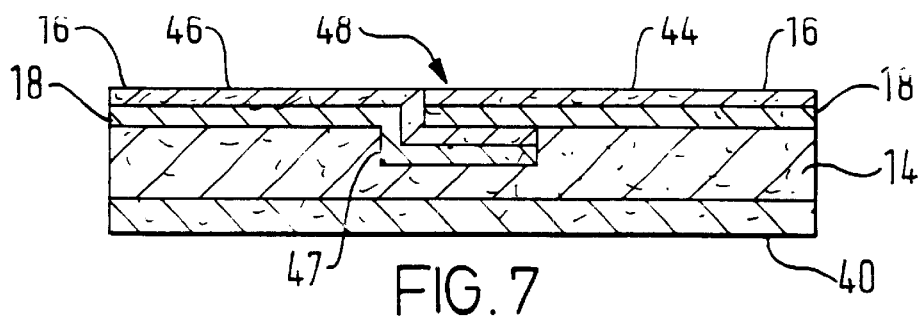
FIG. 7 shows diagrammatically a further method of joining material to form a composite where the warp dominated layer defines a groove-like recess in one surface.

Looking now at FIG. 7, a warp dominated 0° ply 14 is produced on a bi-axial laying-up machine along with a weft dominated 90° ply 40. It will be noted that the 0° ply 14 is formed during the lay-up process with a groove-like recess 47. Two ±45° plies 44.46 comprising plies 16,18 are formed on a multi-axial laying-up machine are fed to the bi-axial laying-up machine so that they overlap as shown in FIG. 7 to form a lap joint 48. The addition of the 90° ply and the overlapping of the two ±45° plies 44, 46 help to compensate for the thinning of the 0° ply where formed with the recess 26. However, if desired, a capping as described above may be provided over the joint 48.

Figure 8:
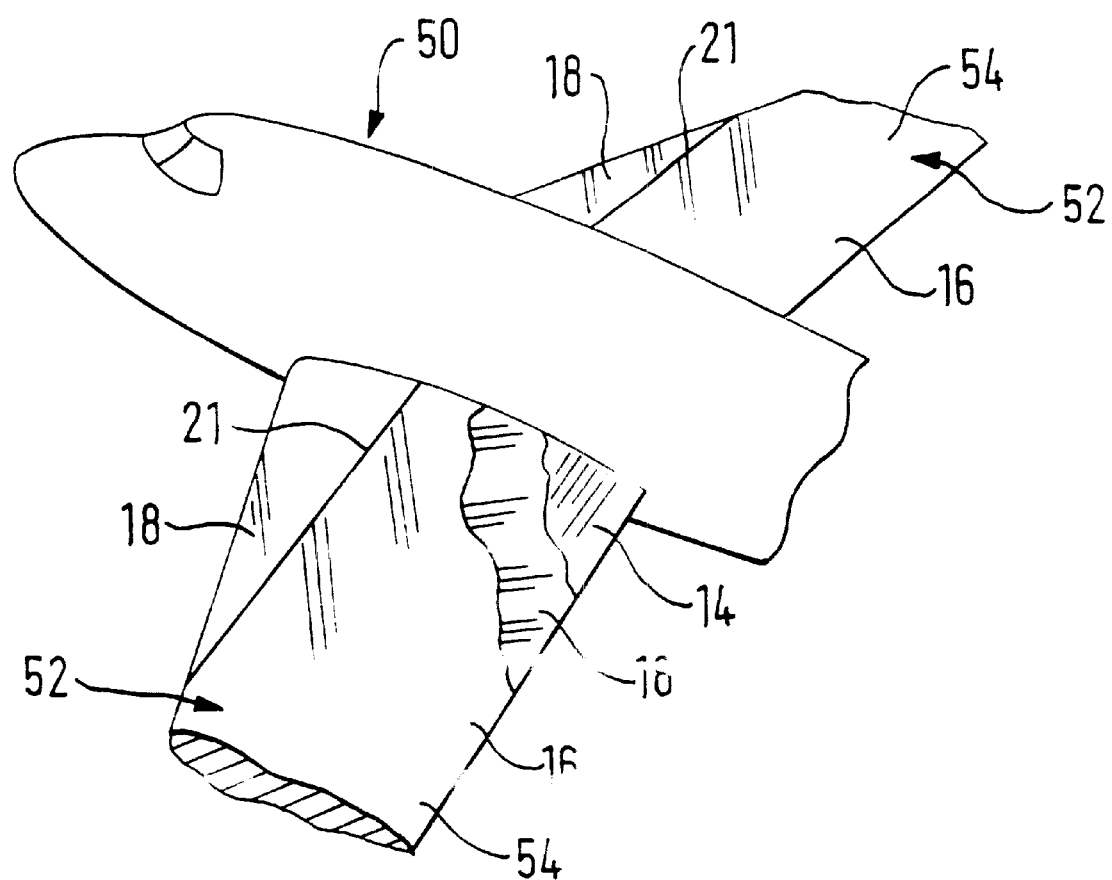
FIG. 8 is a diagrammatic perspective view of an aircraft having a wing which includes a material joined together by a method in accordance with invention.

In FIG. 8 an aircraft 50 has wings 52 each of which is provided with a skin 54 made from a composite material joined by a method in accordance with the invention. The joint is indicated at 21 in FIG. 8 and three plies 14, 16 and 18 are indicated. Typically the 0° fibres of the warp dominated ply 14 will extend spanwise of the wings 52 with the fibres of plies 16, 18 at ±45°.

It will be appreciated that a method in accordance with the invention enables a machine which is used for manufacturing bi-axial fabrics of up to 5 meters in widths to be used to construct a multi-axial fabric of similar widths. hitherto, that has not been possible.

What is claimed is:

1. A method of constructing a composite material construction in the form of a laminate of warp-dominated and weft-dominated plies, the method comprising the steps of arranging a first piece of material and a second piece of material for use in the construction alongside each other with a recess being defined at least partly by one of said plies, and arranging at least a part of one of said first and second pieces of material in said recess so as to form a lap joint with a part of the other said first and second pieces of material, said parts of said first and second pieces of material including weft-dominated plies.

2. The method of claim 1, comprising defining said recess at least partly by one of said warp-dominated plies.

3. The method of claim 1, comprising forming each of said first piece of material and said second piece of material from a laminate of plies, each of said laminates comprising a warp-dominated ply and a weft-dominated ply, said warp-dominated plies of the pieces of material having respective edges, arranging said first piece of material and said second piece of material alongside each other so that said edges of said first and second pieces of material extend in the same direction, said parts comprising weft-dominated plies.

4. The method of claim 3, comprising defining said recess at said edge of said first piece of material.

5. The method of claim 4, comprising defining said recess by setting said edge of said warp-dominated ply of said first piece of material back from an adjacent edge of said weft-dominated ply of said lap joint.

6. The method of claim 4, comprising reducing the thickness of said warp-dominated ply of said second piece of material adjacent its said edge to form a remainder part adjacent said edge of said warp-dominated ply enabling said weft-dominated ply and said remainder part of said warp-dominated ply to enter said recess to form said lap joint.

7. The method of claim 6, comprising bringing an edge of said remainder part of said warp dominated ply of said second piece of material into abutment with said edge of said warp-dominated ply of said first piece of material when forming said lap joint.

8. The method of claim 1, comprising defining said recess by positioning a length of thinner warp-dominated material between said edges of said warp-dominated plies.

9. The method of claim 8, comprising providing a reinforcement member adjacent said lap joint, said reinforcement member providing reinforcement to said construction.

10. The method of claim 9, comprising providing an inclined edge on said reinforcement member.

11. The method of claim 9, comprising forming said reinforcement member as a warp-dominated material.

12. The method of claim 1, comprising defining said recess within said warp-dominated ply.

13. The method of claim 3, comprising forming said recess by positioning a length of thinner warp-dominated material between said edges of said warp-dominated plies and providing said thinner length of warp-dominated material of said edge of said warp-dominated ply of said first piece of material and abutting said thinner length against said edge of said warp-dominated ply of second piece of material.

14. The method of claim 8, comprising forming said length of thinner warp-dominated material from higher fiber count or higher modulus fibers compared to fibers used to construct said warp-dominated ply or plies.

15. The method of claim 8, comprising forming said lap joint so that part of said weft-dominated ply of only one of said pieces of material lies in said recess with part of the other weft-dominated ply of said other piece of material overlapping at least a portion of it.

16. The method of claim 15, comprising arranging said part of said other weft-dominated ply of said other piece of material to overlap all of that part of said weft-dominated ply of said one piece of material.

17. The method of claim 1, comprising forming said recess as a groove in one surface of said warp-dominated ply and providing a further weft-dominated ply on the opposite surface of the recessed warp-dominated ply.

18. The method of claim 15, comprising forming said lap joint, said warp-dominated ply and said further weft-dominated ply by means of a single laying-up operation.

19. The method of claim 1, comprising forming two layers of the jointed material with one layer inverted relative to the other to form two outer layers, each outer layer being defined by one of said warp- and weft-dominated plies.

20. The method of claim 1, comprising arranging said weft-dominated plies at +45° degrees and −45° degrees in relation to said warp-dominated ply.

21. The method of claim 17, comprising providing said further weft-dominated ply at 90 degrees to said wrap-dominated ply.

22. A composite material made by the method as claimed in claim 1, characterized in that said composite material has a width dimension at right angles to said warp-dominated ply in excess of 1.7 meters.

23. An aerofoil having a skin panel formed by material joined by the method claimed in claim 1.

24. An aircraft having a skin panel formed by material joined by a method claimed in claim 1.

25. A composite material construction which comprises a laminate of warp-dominated and weft-dominated plies, wherein the construction comprises first and second pieces of material arranged alongside each other, a recess being defined at least partly by one of said plies, a part of one of said first and second pieces of material being received in said recess and a part of the other piece of material overlapping at least some of said part of said one piece of material to form a lap joint, said parts of said first and second pieces of material including weft-dominated plies.

26. The composite material construction of claim 25, wherein each of said two pieces of material includes a warp-dominated ply and edges of said warp-dominated ply of each piece of material extend in the same direction.

27. The composite material construction of claim 25, wherein said recess is formed in an edge of said first piece of material.

28. The composite material construction of claim 27, wherein said first piece of material includes a warp-dominated ply and an edge of said warp-dominated ply is set back from an adjacent edge of a weft-dominated ply of said first piece of material to define said recess.

29. The composite material construction of claim 25, wherein a thinner warp-dominated material is positioned between edges of said warp-dominated plies to define said recess.

30. The composite material construction of claim 29, wherein said construction comprises a reinforcement member adjacent said lap joint.

31. The composite material construction of claim 30, wherein said reinforcement member has an inclined edge.

32. The composite material construction of claim 25, wherein said recess is defined within said warp-dominated ply.

33. The composite material construction of claim 25, wherein said recess is in the form of a groove in one surface of said warp-dominated ply and a further weft-dominated ply is arranged on the opposite surface of said warp-dominated ply.

34. The composite material construction of claim 25, wherein said construction has a width dimension at right angles to said warp-dominated ply in excess of 1.7 meters.

35. An aerofoil having a skin formed of a composite material construction as claimed in claim 25.

36. An aircraft having a skin panel formed of a composite material construction as claimed in claim 25.

* * * * *

UNITED STATES PATENT AND TRADEMARK OFFICE
CERTIFICATE OF CORRECTION

PATENT NO.   : 6,582,792 B1
DATED        : June 24, 2003
INVENTOR(S)  : Andrew P. Godbehere et al.

It is certified that error appears in the above-identified patent and that said Letters Patent is hereby corrected as shown below:

<u>Title page,</u>
Delete and insert:
-- [63]  Continuation of Application No. PCT/GB99/02670, filed August 12, 1999. --
-- [30]  Foreign Application Priority Data:  August 15, 1998 [GB] Great Britain 9817777.7. --

<u>Column 1,</u>
Lines 3-4, delete and insert:
-- This is a continuation of International Application No. PCT/GB99/02670, filed August 12, 1999. --

Signed and Sealed this

Fourth Day of November, 2003

JAMES E. ROGAN
*Director of the United States Patent and Trademark Office*